(12) United States Patent
Stewart et al.

(10) Patent No.: US 7,174,280 B2
(45) Date of Patent: Feb. 6, 2007

(54) SYSTEM AND METHOD FOR REPLACING PARAMETRICALLY DESCRIBED SURFACE FEATURES WITH INDEPENDENT SURFACE PATCHES

(75) Inventors: Paul Joseph Stewart, Ann Arbor, MI (US); Yifan Chen, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 813 days.

(21) Appl. No.: 10/127,174

(22) Filed: Apr. 23, 2002

(65) Prior Publication Data
US 2003/0200066 A1    Oct. 23, 2003

(51) Int. Cl.
*G06F 17/10* (2006.01)
(52) U.S. Cl. ............................................. 703/2
(58) Field of Classification Search ............... 703/2
See application file for complete search history.

(56) References Cited

U.S. PATENT DOCUMENTS

| | | | |
|---|---|---|---|
| 4,821,214 A | 4/1989 | Sederberg | |
| 4,912,659 A | 3/1990 | Liang | |
| 5,119,309 A * | 6/1992 | Cavendish et al. | 700/182 |
| 5,179,644 A | 1/1993 | Chiyokura et al. | |
| 5,253,331 A | 10/1993 | Lorenzen et al. | |
| 5,278,948 A | 1/1994 | Luken, Jr. | |
| 5,317,682 A | 5/1994 | Luken, Jr. | |
| 5,353,389 A | 10/1994 | Fiasconaro | |
| 5,448,687 A | 9/1995 | Hoogerhyde et al. | |
| 5,459,382 A | 10/1995 | Jacobus et al. | |
| 5,504,845 A | 4/1996 | Vecchione | |
| 5,631,861 A | 5/1997 | Kramer | |
| 5,731,816 A * | 3/1998 | Stewart et al. | 345/419 |
| 5,745,666 A | 4/1998 | Gilley et al. | |
| 5,748,943 A * | 5/1998 | Kaepp et al. | 703/1 |
| 5,771,341 A | 6/1998 | Huddy | |
| 5,792,031 A | 8/1998 | Alton | |
| 5,793,382 A | 8/1998 | Yerazunis et al. | |
| 5,831,584 A | 11/1998 | Socks et al. | |
| 5,846,086 A | 12/1998 | Bizzi et al. | |
| 5,883,631 A * | 3/1999 | Konno et al. | 345/423 |
| 5,903,458 A | 5/1999 | Stewart et al. | |
| 5,921,780 A | 7/1999 | Myers | |
| 5,930,155 A | 7/1999 | Tohi et al. | |
| 5,963,891 A | 10/1999 | Walker et al. | |
| 5,999,187 A | 12/1999 | Dehmlow et al. | |

(Continued)

OTHER PUBLICATIONS

Piegl, L.; IEEE Computer Graphics and Applications, vol. 11, Issue 1, Jan. 1991 pp. 55-71.*

(Continued)

*Primary Examiner*—Paul Rodriguez
*Assistant Examiner*—Russ Guill
(74) *Attorney, Agent, or Firm*—David B. Kelley; Bliss McGlynn (57) ABSTRACT

A system and method for replacing a direct surface manipulation (DSM) surface with an independent NURBS surface patch of a geometric model. The method includes the steps of sampling data points of the DSM surface and parameterizing the sampled data points. The method also includes determining knot vectors for a fitted NURBS surface patch and setting-up an equation system. The method further includes the steps of solving the equation system for the geometric model.

26 Claims, 4 Drawing Sheets

U.S. PATENT DOCUMENTS

| | | | |
|---|---|---|---|
| 6,036,345 | A | 3/2000 | Jannette et al. |
| 6,037,945 | A | 3/2000 | Loveland |
| 6,084,590 | A | 7/2000 | Robotham et al. |
| 6,104,159 | A | 8/2000 | Jacobus et al. |
| 6,198,979 | B1* | 3/2001 | Konno .................. 700/98 |
| 6,253,167 | B1 | 6/2001 | Matsuda et al. |
| 6,256,038 | B1* | 7/2001 | Krishnamurthy ............ 345/419 |
| 6,262,738 | B1 | 7/2001 | Gibson et al. |
| 6,273,724 | B1 | 8/2001 | Roytman |
| 6,996,505 | B1* | 2/2006 | Edelsbrunner et al. ......... 703/2 |
| 2002/0000996 | A1 | 1/2002 | Trika |
| 2002/0133264 | A1 | 9/2002 | Maiteh et al. |
| 2002/0140633 | A1 | 10/2002 | Rafii et al. |
| 2002/0163497 | A1 | 11/2002 | Cunningham et al. |
| 2003/0134676 | A1 | 7/2003 | Kang |

OTHER PUBLICATIONS

Woodward, Charles D.; Cross-sectional design of B-Spline surfaces, 1987, Computers & Graphics, vol. 11, No. 2.*

Piegl, Les; Tiller, Wayne; The NURBS Book, second edition, 1997, Springer, pp. 333-359, 419-441, 455-514.*

Lafon, "Solid Modeling With Constraints and Parameterised Features", IEEE, Jul. 1998.

Jinsong et al., "Parametric Design with Intelligence Configuration Analysis Mechanism", IEEE, Nov. 1993.

Mateos et al., "Parametric and Associative Design of Cartridges for Special Tools", IEEE 1995.

Artificial Intelligence (Understanding Computers), by Time-Life Books, 1986, ISBN 0-8094-5675-3, pp. 36-43.

Juran on Quality by Design, by J.M. Juran, The Free Press, 1992, ISBN 0-02-916683-7, pp. 406-427, and 462-467.

The Computer Science and Engineering Handbook, by Allen B. Tucker, CRC Press, ISBN: 0-8493-2909-4, 1996, p. 1954.

Ramsis—The Human Touch to Technology, p. 1-3 http://www.human-solutions.com/prudukkte_ramsis_e.php.

Purschke-F et al. :Viurtual Reality-New Methods for Improving and Accelerating the Development Process in Vehicle Styling and Design IEEE document via Computer Graphics International Jun. 1998, p. 1-11.

Smid et al., "Human Integration in Simulation" IEEE 1998 pp. 554-558.

Narinder Nayar, DENEB/ERGO—A Simulation-Based Human Factors Tool, 1995, Proceedings of the Winter Simulation Conference, pp. 427-431.

Deidre L. Donald, A Tutorial on Ergonomic and Process Modeling Using Quest and IGRIP, 1998, Proceedings of the 1998 Winter Simulation Conference, pp. 297-302.

Duane et al., "DOE/Opt: A System for Design of Experiments, Response Surface Modeling and Optimization Using Process and Device Simulation" 1993. p. 1-4.

Chen et al., "A Real-Time, Interactive Method for Fast Modification of Large-Scale CAE mesh Models" 2000. p. 1-8.

Chen et al. IMF 1.0 User Manual Project No. AJ499 Ford Research Laboratory Oct. 26, 1999. p. 1-14.

P.J. Stewart, "Direct Shape Control of Free-Form Curves and Surfaces with Generalized Basis Functions", PhD Dissertation, University of Michigan, 1991, pp. 1-237.

Kalra et al,. "Real-Time Animation of Realistic Virtual Humans", Sep./Oct. 1998, IEEE, pp. 42-56.

Nobel et al., "Direct Manipulation of Surfaces Using NURBS-Based Free-Form Deformations", 1999, IEEE, pp. 238-243.

* cited by examiner

SYSTEM AND METHOD FOR REPLACING PARAMETRICALLY DESCRIBED SURFACE FEATURES WITH INDEPENDENT SURFACE PATCHES

BACKGROUND OF THE INVENTION

1. Field of the Invention

The present invention relates generally to computer-aided design of vehicles and, more specifically, to a system and method for replacing parametrically described surface features with independent surface patches in the computer-aided design of a vehicle.

2. Description of the Related Art

Vehicle design, and in particular the design of an automotive vehicle, has advanced to a state in which computer-aided design techniques are frequently incorporated in the development of a new vehicle or redesign of an existing vehicle. Enhanced visualization software tools allow for interactive display and manipulation of large geometric models, including models developed using computer-aided design (CAD). In the field of vehicle design, the use of computer-aided design and visualization techniques are especially beneficial in designing, packaging, and assembling various systems incorporated within the vehicle to maximize the design and functional capabilities of these vehicles.

Certain parametrically described or mathematical surface features, referred to as Direct Surface Manipulation (DSM) features, are capable of describing complex features on existing mathematical surfaces. An example of DSM is disclosed in U.S. Pat. No. 5,903,458 to Stewart et al. for a system and method for forming geometric features using global reparametrization, which disclosure is hereby incorporated by reference. In this patent, an improved DSM method is disclosed which incorporates a global surface reparametrization scheme for the purposes of extending the DSM method to applications involving multiple surfaces and for reducing the geometric effect of parametric spaced distortions on the features. The method reparametrizes multiple surface patches with a shared two-dimensional space defined in the object space of the model. The result is a geometrically consistent mesh, called a super-mesh that serves as a global, uniform parametric space for topologically-disconnected, geometrically-disproportional surface patches. Spherical projection is employed to perform the patch reparameterization. This allows the creation of DSM features on multiple surface patches with improved shape quality.

A limitation of the DSM features, however, is that the underlying mathematics is different than that of the original surface formed from the industry's standard surface representation, i.e., the Non-Uniform Rational B-spline (NURBS). The resulting model is not recognized by standard CAD systems.

Although many commercial CAD systems routinely use non-standard representations as internal, intermediate construction tools for shape creation, the result is typically converted into a NURBS representation for internal consistency and external data exchange. Due to the complexity of the mathematics involved, however, it is generally impossible to analytically translate a DSM representation into a NURBS representation. Hence, the conversion must be done numerically.

The most commonly used numerical method applicable to solving this problem is surface fitting. Surface fitting has been classically concerned with fitting a surface through a cloud of data or sampled points. The data is usually collected by scanning a physical prototype—a process that often includes noise with the measured data. The data points are then fitted using a mathematical surface patch, such as a NURBS surface. The control points of the fitted surface patch are typically located with a least-squares approach, which reduces data and helps to filter out the noise. A least-squares approximation also reduces the oscillations that occur with some polynomial surfaces. However, since the accuracy of fit is measured at the discrete data points, the oscillations are not eliminated.

Therefore, it is desirable to convert DSM features into a standard portion of a recognizable surface patch. It is also desirable to provide a system and method to allow certain types of geometric surface features to be replaced accurately with separate surface patches. Thus, there is a need in the art for a system and method for fitting a DSM feature with a NURBS surface patch and replacing DSM features with independent NURBS surface patches for a CAD model.

SUMMARY OF THE INVENTION

Accordingly, the present invention is a system and method for replacing a direct surface manipulation (DSM) feature with an independent NURBS surface patch for a CAD model. The system includes a computer system having a memory, a processor, a user input device and a display device. The system also includes a computer generated geometric model stored in the memory of the computer system, wherein the geometric model is in a computer-aided design (CAD) format. A user uses the computer system for sampling data points of the DSM feature, parameterizing the sampled data points, determining knot vectors for a fitted NURBS surface patch, setting-up an equation system, and solving the equation system for the CAD model.

One advantage of the present invention is that a system and method are provided for replacing parametrically described surface features with independent surface patches. Another advantage of the present invention is that the system and method allows certain types of geometric surface features to be replaced accurately with separate surface patches using a computer model. Yet another advantage of the present invention is that system and method first replaces the boundaries of the features, uses the information of the replacement boundaries to determine the interior shape of the replacement surface, and further refines the interior of the replacement surface such that it does not affect the boundaries. A further advantage of the present invention is that the system and method is effective at converting DSM features into a standard portion of recognizable surface patch by standard CAD systems.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

A design of a system, such as a vehicle, is achieved according to the present invention with a generic, parametric driven design process. In one embodiment, the computer generated geometric model represents a design form for a vehicle (not shown). The vehicle design form is typically generated using conventional computer-aided design (CAD) including computer-assisted manufacturing (CAM) and computer-assisted engineering (CAE) techniques.

Figure 1:
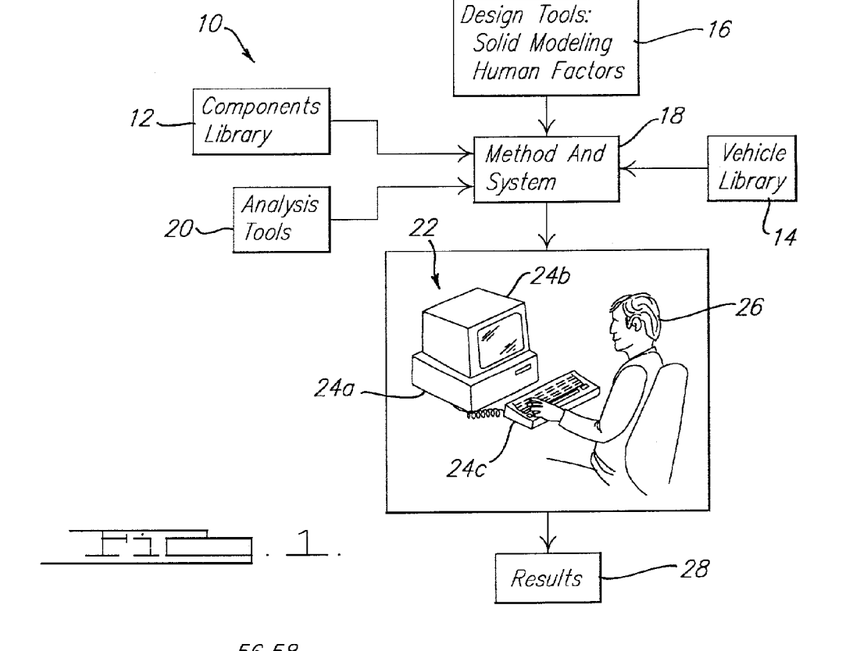
FIG. 1 is a diagrammatic view of a system, according to the present invention, for replacing parametrically derived surface features with independent surface patches.

Referring to the drawings and in particular to FIG. 1, one embodiment of a system 10 for replacing parametrically described surface features with independent surface patches, according to the present invention, is shown. The system 10 includes a knowledge-based engineering library 12 stored on an electronic storage device (not shown) that is operatively connected to a computer system 22 to be described. The knowledge-based engineering library 12 is a database of sub-libraries containing an electronic representation of data including various experts' knowledge of information relevant to the design of a product, such as a vehicle (not shown). The knowledge-based engineering library 12 may include information such as design, assembly, and manufacturing rules and guidelines. The knowledge-based engineering library 12 may also contain data in electronic form regarding various types of vehicle subsystems. The knowledge-based engineering library 12 may further contain predetermined product assumptions regarding the vehicle to be designed, such as model year, style, or production volume. The knowledge-based engineering library 12 may include a sub-library, such as a component parts library of particular component parts used on the vehicle.

The system 10 also includes a vehicle library 14 stored on the electronic storage device. The vehicle library 14 is an electrical representation of a vehicle model or a portion thereof. Advantageously, the vehicle library 14 may contain a geometric model of an exterior portion of a particular vehicle. The vehicle library 14 may include a DSM feature sub-library containing information regarding a particular DSM feature. It should be appreciated that the vehicle library 14 may be a sub-library of the knowledge-based engineering library 12.

The system 10 may also include various computer-aided design (CAD) tools 16. These design tools 16 may include solid modeling, parametric design, and visualization techniques. Solid modeling, for example, takes electronically stored vehicle model data from the vehicle library 14 and standard component parts data from the knowledge-based engineering library 12 and builds complex geometry for part-to-part or full assembly analysis. It should be appreciated that several modeling programs are commercially available and generally known to those skilled in the art.

The parametric design technique is used in the electronic construction of geometry within the computer system 22 for designing the vehicle or a portion thereof. As a particular dimension or parameter is modified, the computer system 22 is instructed to regenerate a new geometry.

The system 10 includes various computer-aided engineering (CAE) analysis tools 20. One example of a CAE analysis tool 20 is computational fluid dynamics (CFD). Another example of a CAE analysis tool 20 is finite element analysis (FEA). It should be appreciated that several software programs are commercially available to perform these analyses and are generally known to those skilled in the art.

The system 10 also includes a computer system 22 having a processor, a controller, and a memory shown at 24a to process information relevant to the method 18, according to the present invention, for replacing parametrically described surface features with independent surface patches. The computer system 22 includes a display device 24b, such as a video terminal, to display a computer-aided vehicle design.

In one embodiment, information is displayed on the video terminal 24b in a series of screens, also referred to as a browser. A user 26 inputs information into the computer system 22 when prompted to do so. The information may represent different parameter alternatives. The set of parameters or the set of instructions may be specific to the method 18 for replacing parametrically described surface features with independent surface patches, wherein other data and information non-specific to the method 18 may already be stored in the memory 24a of the computer system 22. It should be appreciated that selection and control of the information within a screen can be achieved by the user 26, via a user interactive device 24c, such as a keyboard or a mouse as is known in the art.

One example of an input method is a drawing technique to draw a box around a local region of the model using the user interactive device 24c, such as the mouse. In one embodiment, the drawing process includes a click, drag and release of the mouse as is known in the art. Another type of input method is a graphical user interface that allows menu selection, parameter modification, and performs other types of viewing operations. Another example of an input method is a pop-up dialog box containing available information or instructions. Preferably, the computer system 22 provides for fast display capability for rendering and viewing of complex and large mesh models.

The computer system 22 utilizes the set of information or instructions from the user 26, information from the libraries 12,14, design tools and analysis tools 16,20 and any other information in carrying out the method 18, according to the present invention and discussed in detail subsequently, for replacing parametrically described surface features with independent surface patches.

Advantageously, this is a time and cost savings as compared to performing the same technique using a physical model. In addition, the computer-implemented method 18 for replacing parametrically described surface features with independent surface patches combines all of the foregoing to provide an efficient, flexible, rapid tool for creating and evaluating the design of a vehicle. Furthermore, information obtained during the evaluation of the design is an output or result of the method 18 as shown at 28 and is available for further analysis and study.

Figure 2A:
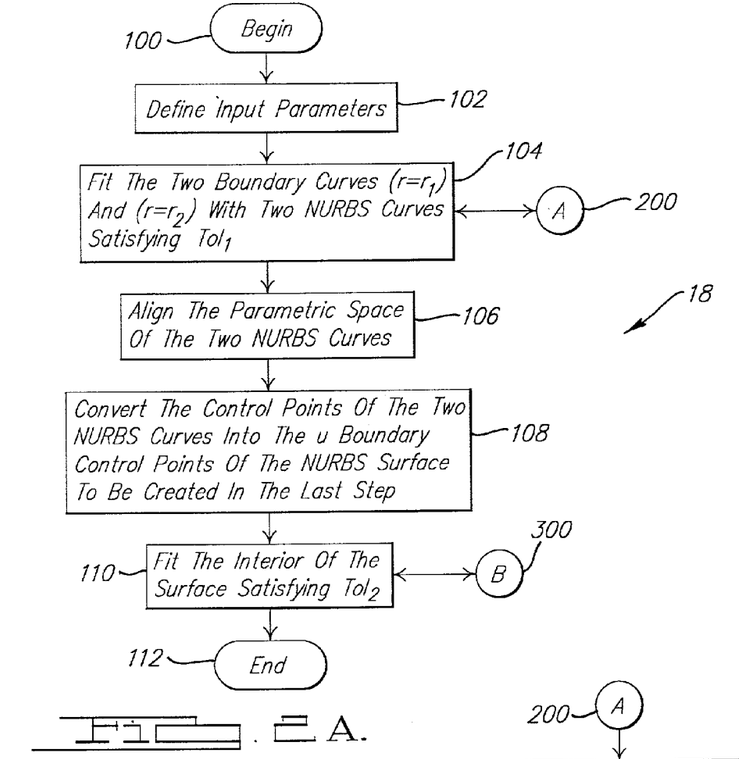
FIGS. 2A through 2C is a flowchart of a method, according to the present invention, for replacing parametrically described surface features with independent surface patches using the system of FIG. 1.
Figure 2B:
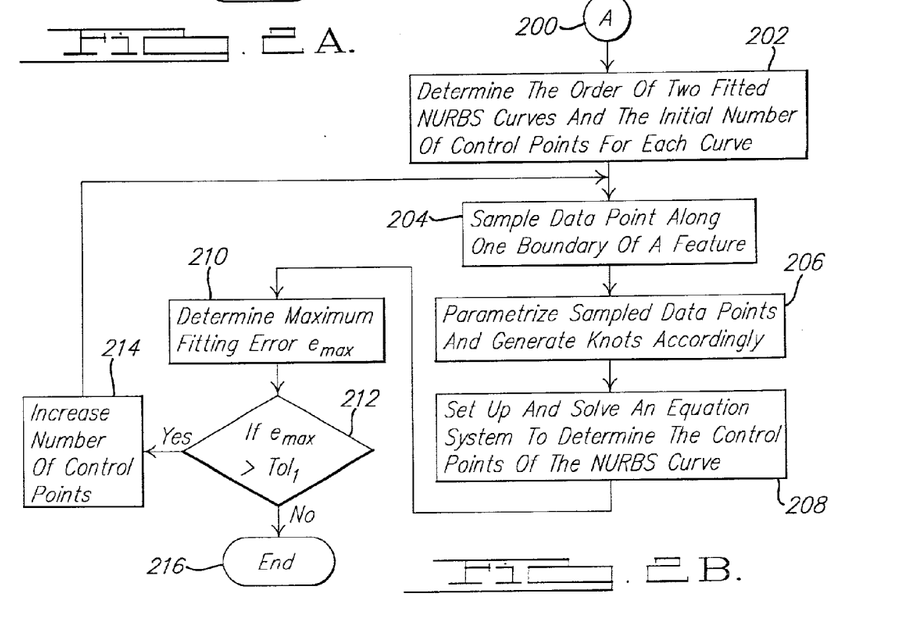
Figure 2C:
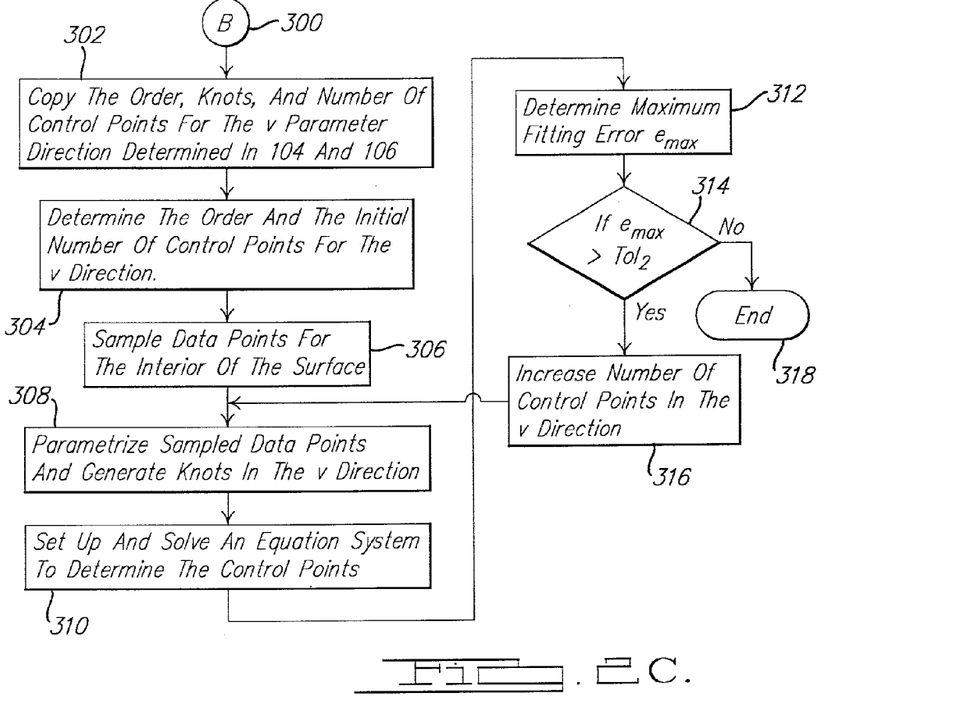

Referring to FIGS. 2A through 2C, the method 18, according to the present invention, for replacing parametrically described surface features with independent surface patches is shown. Preferably, the use of direct mesh modeling expands and integrates a mathematical surface modeling technique referred to in the art as Direct Surface Manipulation (DSM). With DSM, an entire surface feature is placed on an existing parametric surface as a single geometric entity. After the feature is created, the user 26 can control its location, shape, and continuity independently by adjusting corresponding parameters.

Referring to FIG. 2A, the methodology starts or begins in bubble 100. In bubble 100, the user 26 selects a geometric model, and the model is imported into the methodology. Preferably, the model is a computer generated, computer-aided design (CAD) model, digital buck or other mathematical or geometric representation, that is maintained in a computer database such as the vehicle library 14, as previously described. The model is represented using a standard data format, such as a set of NURBS, a three-dimensional solid CSG, or a polygonal representation. In one embodiment, the model represents a vehicle and in particular a portion of a body of the vehicle. Further, the user 26 may select a surface representing a section of the model such as by drawing a box (not shown) around the desired section of the model using the user interactive device 24c such as the mouse.

In bubble 100, the methodology converts the CAD model 24 into a geometric model. An example of a geometric model is a mesh model, whereby each point representing the model is uniquely identified by a set of coordinates within a known coordinate system. Known mesh formats include STL and NASTRAN. It should be appreciated that computer programs are commercially available for configuring a CAD model as a mesh model. In addition, global and local connectivity information between mesh elements can be stored in a sub-library of the vehicle library 14 for quicker direct surface modeling feature creation and manipulation. The user 26 selects a portion to modify. In one embodiment, the surface of the model contains features, such as raised sections or depressions. An example of such a feature is a fillet as disclosed in U.S. Pat. No. 5,731,816 to Stewart et al., the disclosure of which is hereby incorporated by reference.

The methodology modifies the model using a mathematical surface modeling technique referred to in the art as Direct Surface Manipulation (DSM). In DSM, an entire surface feature is placed on an existing parametric surface as a single geometric entity. After the feature is created, the user 26 can intuitively control its location, shape, and continuity independently by adjusting corresponding parameters on a real-time basis. Advantageously, DSM provides for modifications to a model without relying on CAD techniques.

In general, a method, according to the present invention, is used to replace a parametrically described surface or DSM feature with an independent NURBS surface patch. The method replaces the DSM feature by first replacing the boundaries of the feature. The method then uses the information of the replacement boundaries to determine the interior shape of the replacement surface patch. The interior of the replacement surface patch may be further refined in a way such that it does not affect the boundaries.

Figures 5, 6:
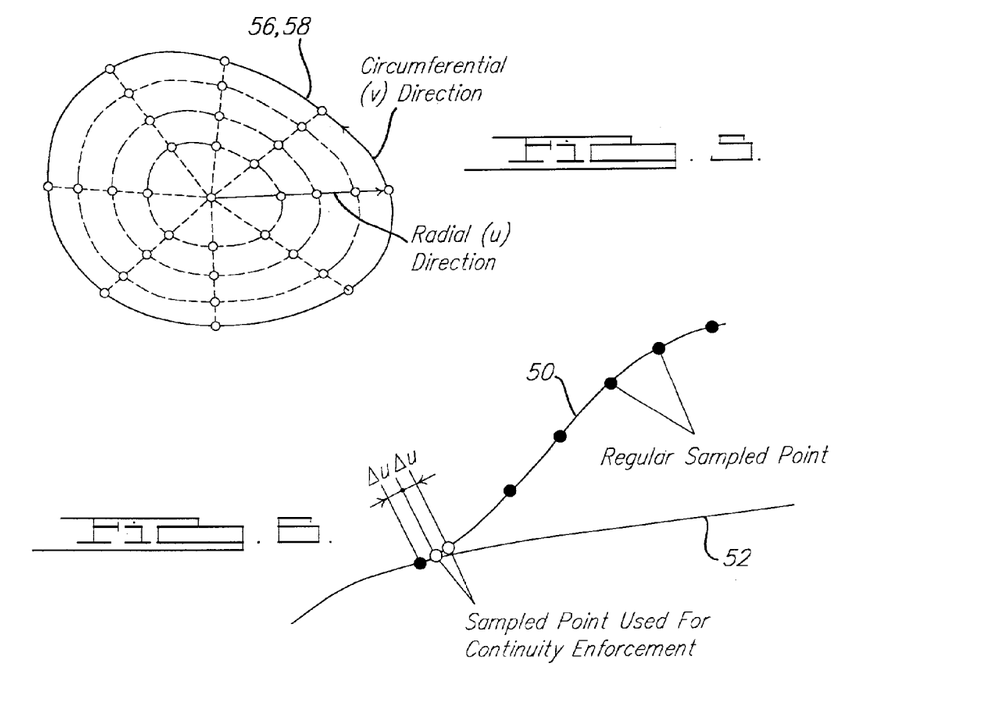
FIG. 5 is a diagrammatic view of DSM data sampled along radial and circumferential directions of a DSM feature for the method of FIG. 2.
FIG. 6 is a diagrammatic view of numerical enforcement of continuity along the radial direction of a DSM feature.

The method uses a sampling scheme to match topology alignment with the radial and circumferential directions of the DSM feature, combined with more effective methods of parameterization and fitting. Matching the topology means that each column of data points oriented in the radial direction of the DSM feature would correspond to an iso-parameter line in one parameter direction of the NURBS surface patch and each row of points oriented in the circumferential direction would correspond to an iso-parameter line in the other parameter direction. Without losing generality, the radial direction is linked to the "u" direction of the fitted surface patch and the circumferential direction or the "v" direction of the surface patch as illustrated in FIG. 5.

The method differs, however, by using a direct, one-step interpolation scheme instead of an iterative interpolation scheme to locate the control points of the NURBS surface patch. The iterative scheme avoids the oscillations that often arise when solving system of equations with sampled data containing measurement noises. However, in the method of the present invention, noise is not a concern because data points are sampled from an analytical surface and the process of data acquisition is basically noise-free. This allows a determination of the fitted surface patch directly with a linear system of equations established at the sampled points.

On a conceptual level, direct interpolation means setting up and solving the following linear system of equations:

$$[B][P]=[S] \qquad (1)$$

where [S] is a vector containing the position of the sampled data points in object space, [P] is a vector containing the unknowns or coefficients of the B-spline or NURBS control points, and [B] is a matrix of constants derived from the basis functions of the NURBS surface patch. Since the system is linear, the number of control points in the linear system is the same as the number of data points sampled.

Figure 4A:
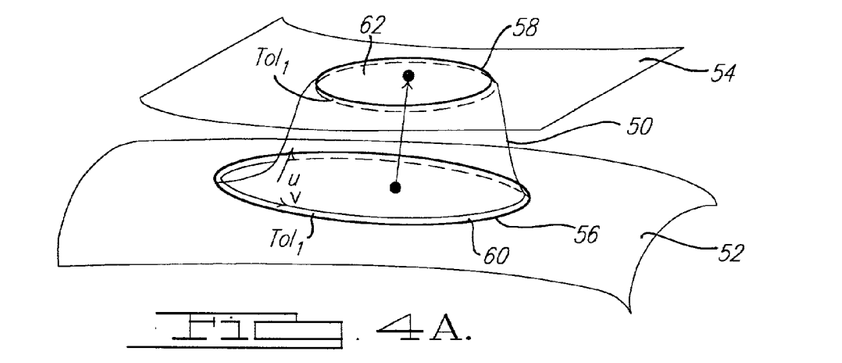
FIGS. 4A through 4E are diagrammatic views illustrating a direct surface manipulation feature and independent surface patch for the method of FIG. 2.
Figure 4B:
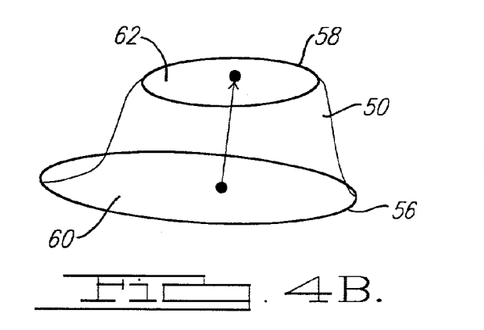
Figure 4C:
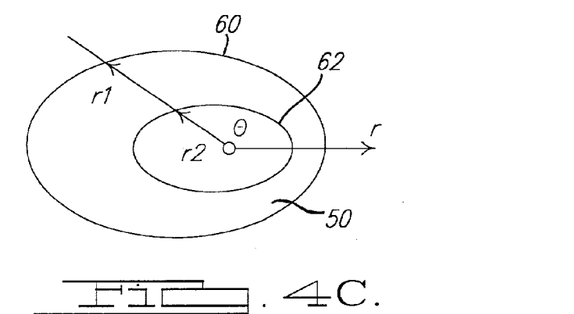

The method also enforces the continuity conditions across boundaries described in conjunction with FIGS. 4A through 4C. As illustrated in FIG. 4A, a double bound DSM surface or feature or fitted surface $Q(\theta,r)$ 50 is shown. The DSM surface or feature 50 is bound between a base surface 52 and a target surface 54. The parameter surface concerned here is a feature representing a blend from one boundary on the base surface 52 to another boundary on the target surface 54. It should be appreciated that the base surface 52 and target surface 54 are NURBS surfaces.

As illustrated in FIGS. 4A and 4B, a feature boundary projected onto the base surface 52 is called an outer boundary 56. A feature boundary projected onto the target surface 54 is called an inner boundary 58. The tolerance at the outer boundary 56 and inner boundary 58 is $Tol_1$. An outer surface 60 and an inner surface 62 are created by the boundaries 56 and 58. The two dimensional domain of the DSM surface or feature 50 is represented by the radial (r) and angular (θ) directions as illustrated in FIG. 4C. It should be appreciated that the objective of the present invention is to convert $Q(\theta,r)$ of FIG. 4B into an industry standard NURBS surface $S(u,v)$.

Figure 4D:
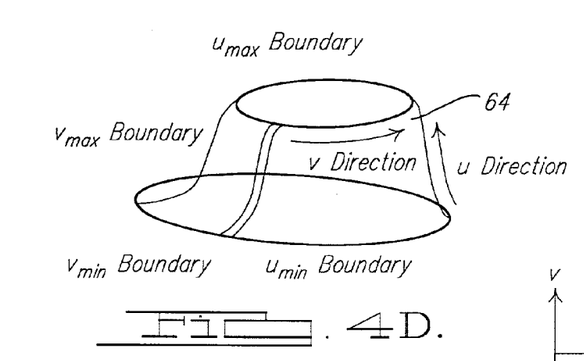
Figure 4E:
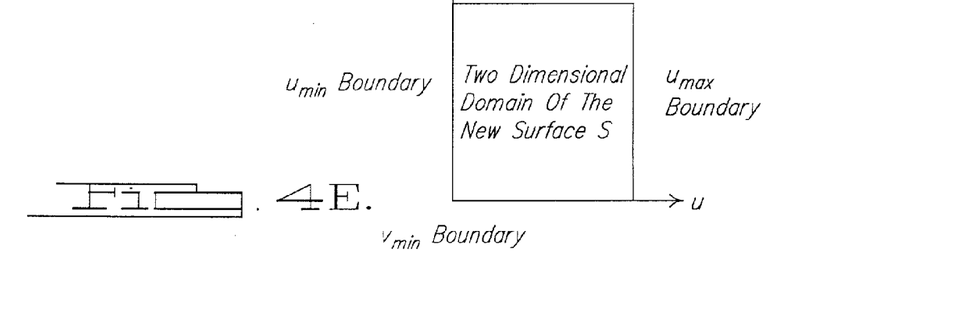

Referring to FIGS. 4D and 4E, the method also enforces continuity conditions across the boundaries 56 and 58. In the circumferential (v) direction, this is along a joint between either end of a surface patch $S(u,v)$ 64. In the radial direction (u), this is between the DSM surface or feature 50 and the base surface 52 at the outer boundary 56 and between the DSM surface or feature 50 and the target surface 54 at the interior boundary 58.

The radial boundary conditions are met by taking extra data points, closely spaced, in the radial direction at the boundary 56,58, as illustrated in FIG. 6. One extra point is taken for every additional degree of continuity. Since the NURBS surface patch 64 interpolates the sampled points, it will have a geometric continuity equivalent to that of the original DSM surface or surface 50. It should be appreciated that DSM mathematics allows a real number continuity at the boundary 56,58, which needs to be rounded into an integer in the method of the present invention.

For example, to enforce a continuity of 2.3, we first round down to 2 and then sample two consecutive points at the boundary 56,58 spaced Δu apart. This forces the fitted surface patch 64 to have position, slope, and curvature numerically equivalent to the original DSM surface or feature 50 in the radial (u) direction. It should be appreciated that, however, in between the two iso-parameter lines in the radial (u) direction, the surface patch 64 boundary conditions are not directly controlled. It should also be appreciated that this can be compensated for indirectly by sampling points along the boundary 56,58 with sufficient density.

Referring to FIG. 2A through 2C, one embodiment of a method, according to the present invention, of fitting or replacing DSM surface or features 50 with independent NURBS surface patches 64 is illustrated. In general, the method includes sampling the DSM surface or feature 50, parameterizing the sampled data points, determining the knot vectors for the fitted NURBS surface or surface patch 64, setting-up an equation system, and solving the equation system. The methodology begins after bubble 100 and advances to block 102.

In block 102, the method defines input parameters. These parameters are the parametric surface representation of two dimension (r,θ), tolerance for boundary conversion ($Tol_1$), and tolerance for interior conversion ($Tol_2$) as previously described. The methodology then advances to block 104 and fits the boundary curves ($r=r_1$) and ($r=r_2$) with two NURBS curves satisfying $Tol_1$. This step of the methodology is shown in further detail in FIG. 2B.

Referring to FIG. 2B, this step of the methodology begins in circle A shown at 200 when called for by block 104 of FIG. 2A and advances to block 202. In block 202 the method determines the order of two fitted NURBS curves and the initial number of control points for each curve. The method then advances to block 204 and samples data points along one boundary 56,58 of the DSM surface or feature 50. In block 204, the method obtains an array of data points for each boundary 56,58 in the object space.

These points will then be parameterized and knots are generated in block 206 for each of the boundary NURBS curve to be created. A system of equation is set up for each boundary 56,58 in block 208 and solved accordingly for the final NURBS representation. The NURBS curve is then checked for its accuracy in describing the original boundary in block 210 by determining a maximum fitting error $e_{max}$. If the maximum fitting error is greater than $Tol_1$ in diamond 212, then the method advances to block 214 and the number of sample points (i.e., the number of control points) is increased and the process goes back to block 204 previously described. If $e_{max}$ is not greater than $Tol_1$, the method advances to bubble 216 and ends, returning to block 104. The method then advances to block 106 and aligns the parametric space of the two NURBS curves. The method advances to block 108 and converts the control points of the two NURBS curves into the radial (u) boundary control points of the NURBS surface to be created in block 106.

Figure 3:
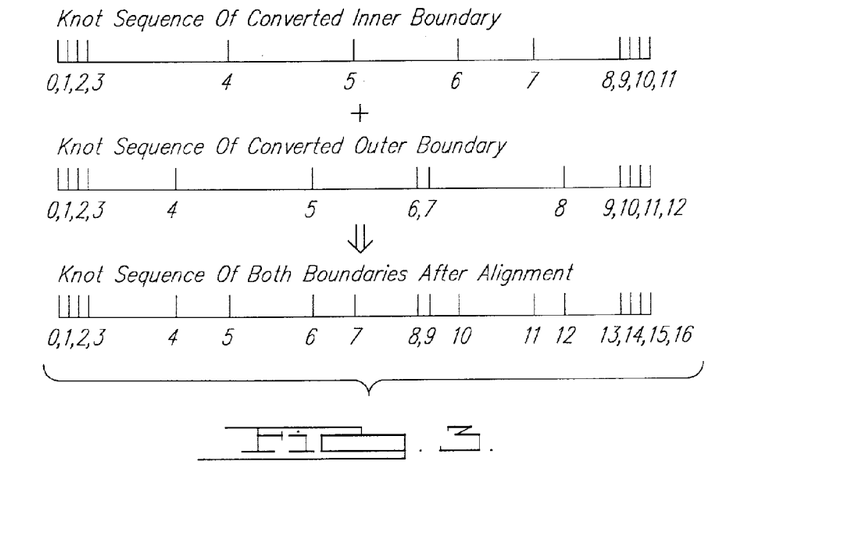
FIG. 3 is a diagrammatic view of knot sequences for use with the method of FIG. 2.

The two boundary NURBS curves obtained this way will most likely have different knot sequences. The union of the two-knot sequences produces a new one that can be used as the common denominator for the two boundary curves. This is illustrated in FIG. 3. It should be appreciated that well-know knot insertion algorithms can be used to add notes into the two boundary curves without affecting their analytical shapes. It should also be appreciated that the resulting common curve structure, hence, determines the structure in the circumferential v direction of the final fitted NURBS surface.

After the knot realignment of the two boundary NURBS curves, the method advances to block 110 of FIG. 2A to fit the interior of the DSM surface or feature 50. The details of block 110 are illustrated in FIG. 2C. Referring to FIG. 2C, this method begins in circle B shown at 300 when called for by block 110, where the unified knots of the two boundary curves are used as the surface structure for the circumferential (v) direction of the DSM surface or feature 50. The method advances to block 302 and copies the older, knots, and number of control points for the circumferential (v) direction determined in blocks 104 and 106. The method then advances to block 304 where the initial knot structure and number of control points along the radial (u) direction of the DSM surface or feature 50 is determined.

To represent the general shape of a given DSM surface or feature 50, points are sampled in both the radial (u) and circumferential (v) directions in block 306. The radial and circumferential correspond to the u and v directions, respectively, of the fitted surface patch 64 Q(u,v). As such, $S_{ij}$ can be used to denote a sampled point, where i is the index to the position of the point in the u or radial direction and j is the index in the v or circumferential direction.

To numerically enforce the continuity conditions in the radial direction, additional data points are sampled near the boundary 56,58 between the DSM surface or feature 50 and the base surface 52 along each radial line sampled. The number of the extra points needed depends on the continuity at the boundary 56,58. In general, this number is equal to the integer portion of the continuity. For instance, continuity factors of 2.3 or 2.8 are both regarded as curvature or $C^2$ continuous, thus two additional points are necessary. For a double bound feature, an additional number of points, determined in the same manner, are also sampled near the apex to enforce a desired continuity across the peak.

For close enforcement of the boundary conditions, the sampled points must be very close to each other in the radial (u) direction. In FIG. 6, Δu indicates the radial (u) distance between two consecutive points sampled for a second order continuity (not the distance in object space). Clearly, if Δu is too small, two of the equations would be similar and the linear system of equations may become near-singular. If Δu is too large, on the other hand, then the continuity condition may not be properly enforced. In the present invention, a heuristic technique is used to compute the proper value of Δu as follows:

$$\Delta u = 10^{-(11-2c)} \quad (2)$$

where c is the continuity. It should be appreciated that the heuristic formula is effective to enforce up to fourth order continuity.

After the data points are sampled from the DSM surface or feature 50, the method advances to block 308 and parameterizes the sampled data points. In block 308, the method associates the data points to locations on the fitted surface patch 64. This information is used to define the blending functions relating the control points to the sampled data points. In block 308, the data points are parameterized in terms of u and v. Based on this parameterization, the knot vector of the fitted surface patch 64 in the radial u direction is determined.

A general exponent method having a single formula is used to account for all three parameterizations: uniform, chord-length, and centripetal. Taking the u direction as an example, let $u_i(u_{0,i} \ldots u_{n,i})$ be a vector representing the u values of the i—th column of data points along the radial (u) direction of the DSM surface or feature 50. Applying this method yields the following formula:

$$u_{k,i} = u_{k-1,i} + \frac{|S_{k,i} - S_{k-1,i}|^E}{\sum_{k=1}^{n} |S_{k,i} - S_{k-1,i}|^E} \quad k = 1, \ldots, n-1 \qquad (3)$$

u0=0 and un=1. It can be verified that, when e=0.0, Equation (3) reduces to uniform parameterization, when e=1.0, Equation (3) reduces to chord-length parameterization.

For DSM fitting, the uniform parameterization is used in the v or circumferential direction to meet the requirement of the periodic surface patch 64. It should be appreciated that, in the u or radial direction, an e=1.0 (chord-length parameterization) produces the best results, i.e., the fitted surface patch 64 best enforced the boundary conditions, provided a good internal position fit with the original DSM surface or feature 50, and exhibited no oscillations.

In the present method, the fitted surface patch 64 is given uniform knots in the v or circumferential direction to meet the requirement of the periodic surface patch 64. In the u or radial direction, on the other hand, knots are calculated by an averaging method. The method attempts to reflect the distribution of parameter values between the sampled points. For a B-spline or NURBS defined on the parameter u of degree p with n control points, the knot vector may be defined by u(u0, . . . , um), where m=n+p+1. By the averaging scheme, the knot vectors can be found using the following formula:

$$\bar{u}_{j+p} = \frac{1}{p-1} \sum_{i=j}^{j+p-1} u_i \quad j = 1, \ldots, n-p \qquad (4)$$

with $\bar{u}_0 = \cdots = \bar{u}_p = 0$ $\bar{u}_{m-p} = \cdots = \bar{u}_m = 1$ It should be appreciated that this technique simply does a moving average of the parameter values of the sampled points.

From block 308, the method advances to block 310 and sets-up and solves an equation system to determine the control points of the NURBS curve. In block 310, the method assembles the matrices of the linear system and solves the equation system to give the control points of the fitted surface patch 64. Assume that n+1 sampled data points in the radial (u) direction and m+1 in the circumferential (v) direction of the fitted surface patch 64 are obtained. Let l = (n+1)×(m+1). Based on the u,v values of these points and knot vectors determined in the previous steps, system (1) can be set up as follows:

$$[S]_l = \begin{bmatrix} S_{u_0,v_0} \\ \vdots \\ S_{u_n,v_0} \\ S_{u_0,v_1} \\ \vdots \\ S_{u_n,v_1} \\ \vdots \\ S_{u_0,v_m} \\ \vdots \\ S_{u_n,v_m} \end{bmatrix} \qquad (6)$$

$$[P]_l = \begin{bmatrix} P_{0,0} \\ \vdots \\ P_{n,0} \\ P_{0,1} \\ \vdots \\ P_{n,1} \\ \vdots \\ P_{0,m} \\ \vdots \\ P_{n,m} \end{bmatrix} \qquad (7)$$

-continued $$[B]_{l\times l} = \begin{bmatrix} B_{0,0}(u_0,v_0) & \cdots & B_{n,0}(u_0,v_0) & B_{0,1}(u_0,v_0) & \cdots & B_{n,1}(u_0,v_0) & \cdots & B_{0,m}(u_0,v_0) & \cdots & B_{n,m}(u_0,v_0) \\ \vdots & & & & & & & & & \\ B_{0,0}(u_n,v_0) & \cdots & B_{n,0}(u_n,v_0) & B_{0,1}(u_n,v_0) & \cdots & B_{n,1}(u_n,v_0) & \cdots & B_{0,m}(u_n,v_0) & \cdots & B_{n,m}(u_n,v_0) \\ B_{0,0}(u_0,v_1) & \cdots & B_{n,0}(u_0,v_1) & B_{0,1}(u_0,v_1) & \cdots & B_{n,1}(u_0,v_1) & \cdots & B_{0,m}(u_0,v_1) & \cdots & B_{n,m}(u_0,v_1) \\ \vdots & & & & & & & & & \\ B_{0,0}(u_n,v_1) & \cdots & B_{n,0}(u_n,v_1) & B_{0,1}(u_n,v_1) & \cdots & B_{n,1}(u_n,v_1) & \cdots & B_{0,m}(u_n,v_1) & \cdots & B_{n,m}(u_n,v_1) \\ B_{0,0}(u_0,v_m) & \cdots & B_{n,0}(u_0,v_m) & B_{0,1}(u_0,v_m) & \cdots & B_{n,1}(u_0,v_m) & \cdots & B_{0,m}(u_0,v_m) & \cdots & B_{n,m}(u_0,v_m) \\ \vdots & & & & & & & & & \\ B_{0,0}(u_n,v_m) & \cdots & B_{n,0}(u_n,v_m) & B_{0,1}(u_n,v_m) & \cdots & B_{n,1}(u_n,v_m) & \cdots & B_{0,m}(u_n,v_m) & \cdots & B_{n,m}(u_n,v_m) \end{bmatrix} \quad (8)$$

where $\{P_{i,j}\}$ are the control points of the fitted surface patch 64, $\{S_{i,j}\}$ are the sampled data points of the fitted surface patch 64, and $\{B_{i,j}(u,v)\}$ is the blending function of the control point $P_{i,j}$ evaluated at each data point $Q(u,v)$.

Once Equation (5) is set up, the method solves the equation directly using a standard solver, such as Gaussian elimination. However, given the fact that all equations in the system are positional, they can be solved more efficiently using the method suggested in U.S. Pat. No. 5,903,458. In order to explain, the system can be rewritten in the following form:

$$S(u_k, v_l) = \sum_{i=0}^{n} \sum_{j=0}^{m} B_{i,p}(u_k)B_{j,q}(u_l)P_{i,j} \quad k=1,\ldots,n-1, l=1,\ldots,m-1 \quad (9)$$

Since $S(u,v)$ is a tensor product surface, the equations in Equation (9) can be separated along the u and v parameter directions and solved in two steps. Firstly, m+1 curve interpolations through $S_{0,l},\ldots,S_{n,l}$ for $l=0,\ldots,m$ as follows:

$$S_{k,l} = \sum_{i=0}^{n} B_{i,p}(\bar{u}_k)\left(\sum_{j=0}^{m} B_{j,q}(u_l)P_{i,j}\right) = \sum_{i=0}^{n} B_{i,p}(u_k)R_{i,l} \quad (10)$$

This yields ma vectors $R_{i,l}$. Then n+1 curve interpolations through $R_{i,0},\ldots,R_{i,m}$ for $i=0,\ldots,n$ as follows:

$$R_{i,l} = \sum_{j=0}^{m} B_{j,q}(u_l)P_{i,j} \quad (11)$$

which yields the control points, $P_{i,j}$, of the fitted surface patch 64. Equations (10) and (11) are solved using a Gaussian elimination with scaled pivoting. It should be appreciated that, since the two step approach effectively converts a system of n×m equations into two smaller systems of n and m equations, it is much more efficient to solve. From block 310, the method advances to block 312 and determines the maximum fitting error $e_{max}$. The method then advances to diamond 314 and determines whether $e_{max}$ is greater than a second predetermined tolerance $Tol_2$. If so, the method advances to block 316 and increases the number of control points. The method then advances to block 304 previously described. If $e_{max}$ is not greater than the second predetermined tolerance $Tol_2$, the method advances to bubble 318 and ends, returning to block 110 and advances to bubble 112 and ends.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A system for replacing a direct surface manipulation (DSM) surface with an independent Non-Uniform Rational B-spline (NURBS) surface patch of a geometric model comprising:
   a computer system, wherein said computer system includes a memory, a processor, a user input device and a display device;
   a computer generated geometric model stored in said memory of said computer system, wherein the geometric model is in a computer-assisted design (CAD) format; and
   wherein a user uses the computer system and the computer system samples data points of a DSM feature, parameterizes the sampled data points, determines knot vectors for a fitted NURBS surface patch, sets-up an equation system, solves the equation system to determine control points of the NURBS surface patch, fits the interior of the NURBS surface patch to the sampled data points of the DSM surface, and replaces the DSM surface with the NURBS surface patch.

2. A system as set forth in claim 1 wherein the computer system includes a knowledge-based engineering library and the geometric model is stored in the knowledge-based engineering library.

3. A system as set forth in claim 1 wherein the computer system uses direct surface manipulation of the surface of the geometric model to parameterize a vertex on the surface of the geometric model within a domain of a DSM feature.

4. A method for replacing a direct surface manipulation (DSM) surface with an independent Non-Uniform Rational B-spline (NURBS) surface patch of a geometric model, said method comprising the steps of:
    selecting a geometric model, wherein the geometric model is in a computer-aided design (CAD) format stored in memory of a computer system;
    sampling data points of the DSM surface using the computer system;
    parameterizing the sampled data points using the computer system;
    determining knot vectors for a fitted NURBS surface patch using the computer system;
    setting-up an equation system using the computer system;
    solving the equation system using the computer system to determine control points of the NURBS surface patch; and
    fitting the interior of the NURBS surface patch to the sampled data points of the DSM surface and replacing the DSM surface with the NURBS surface patch using the computer system.

5. A method as set forth in claim 4 wherein said step of solving includes determining control points of the NURBS surface patch.

6. A method as set forth in claim 5 including the step of determining a maximum fitting error.

7. A method as set forth in claim 6 including the step of determining whether the maximum fitting error is greater than a predetermined tolerance.

8. A method as set forth in claim 7 including the step of increasing the number of the control points if the maximum fitting error is greater than the predetermined tolerance.

9. A method as set forth in claim 7 including the step of ending the method if the maximum fitting error is not greater than the predetermined tolerance.

10. A method for replacing a direct surface manipulation (DSM) surface with an independent Non-Uniform Rational B-spline (NURBS) surface patch of a geometric model, said method comprising the steps of:
    defining input parameters;
    fitting two boundary curves with two NURBS curves satisfying a first predetermined tolerance using a computer system;
    aligning a parametric space of the two NURBS curves using the computer system;
    converting control points of the two NURBS curves into boundary control points of the NURBS surface patch to be created using the computer system; and
    fitting the interior of the NURBS surface patch satisfying a second predetermined tolerance to the DSM surface and replacing the DSM surface with the NURBS surface patch using the computer system.

11. A method as set forth in claim 10 wherein said step of fitting the two boundary curves includes determining the order of the two fitted NURBS curves and an initial number of control points for each curve.

12. A method as set forth in claim 11 including the step of sampling data points along one boundary of the DSM surface.

13. A method as set forth in claim 12 including the step of parameterizing the sampled data points and determining knot vectors for the NURBS surface patch.

14. A method as set forth in claim 13 including the step of setting-up an equation system and solving the equation system to determine the control points of the NURBS curve.

15. A method as set forth in claim 14 including the step of determining a maximum fitting error.

16. A method as set forth in claim 15 including the step of determining whether the maximum fitting error is greater than the first predetermined tolerance.

17. A method as set forth in claim 16 including the step of increasing the number of control points if the maximum fitting error is greater than the first predetermined tolerance.

18. A method as set forth in claim 16 including the step of ending the method if the maximum fitting error is not greater than the first predetermined tolerance.

19. A method as set forth in claim 10 wherein said step of fitting the interior of the NURBS surface patch includes copying the order, knots, and number of control points for the NURBS curves in the v parameter direction determined in previous steps.

20. A method as set forth in claim 19 including the step of determining the order and an initial number of control points for a circumferential parameter direction.

21. A method as set forth in claim 20 including the step of sampling data points for the interior of the NURBS surface patch.

22. A method as set forth in claim 21 including the step of parameterizing sampled data points and generating knots in a radial parameter direction.

23. A method as set forth in claim 22 including the step of setting-up an equation system and solving the equation system to determine the control points of the NURBS curve.

24. A method as set forth in claim 23 including the step of determining whether a maximum fitting error is greater than a second predetermined tolerance.

25. A method as set forth in claim 24 including the step of increasing the number of control points if the maximum fitting error is greater than the second predetermined tolerance.

26. A method as set forth in claim 24 including the step of ending the method if the maximum fitting error is not greater than the second predetermined tolerance.

* * * * *